United States Patent Office 3,364,264
Patented Jan. 16, 1968

1

3,364,264
PROCESS FOR THE MANUFACTURE OF OLE-
FINICALLY UNSATURATED KETONES
Harley F. Hardman, Lyndhurst, and Robert K. Grasselli,
Garfield Heights, Ohio, assignors to The Standard Oil
Company, Cleveland, Ohio, a corporation of Ohio
No Drawing. Filed Jan. 25, 1965, Ser. No. 427,980
12 Claims. (Cl. 260—586)

ABSTRACT OF THE DISCLOSURE

Olefinically unsaturated ketones, such as methyl vinyl ketone, are produced by oxidizing saturated alcohols or ketones, such as secondary butanol or methyl ethyl ketone, in the presence of an oxidation catalyst.

This invention relates to the process for the manufacture of olefinically unsaturated ketones from saturated ketones and secondary alcohols and more particularly pertains to the manufacture of alpha, beta-olefinically unsaturated ketones from the corresponding saturated ketones or secondary alcohols in the presence of an oxygen containing gas over a solid catalyst.

The present process is conveniently carried out by contacting a ketone or a secondary alcohol or mixtures thereof in the vapor phase together with molecular oxygen or a gas containing molecular oxygen with a solid catalyst in either fixed or fluidized bed type of reaction.

The saturated alcohols and ketones useful as starting materials in the instant process are those having the structures:

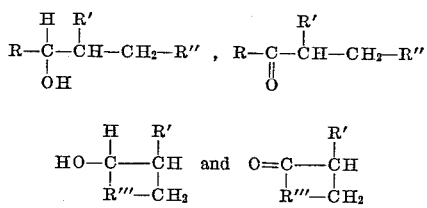

wherein R is a hydrocarbon group having from 1 to 12 carbon atoms, R' and R" each independently may be hydrogen or a hydrocarbon group having from 1 to 12 carbon atoms and R''' is a divalent hydrocarbon radical having from 1 to 12 carbon atoms.

The groups R' and R" may be alkyl, alkenyl, cycloalkyl, aryl, alkaryl or aralkyl groups and R''' may be divalent alkyl, alkenyl, cycloalkyl, aryl, alkaryl or aralkyl radicals. The olefinically unsaturated ketones produced by the process of this invention are primarily those having the structures:

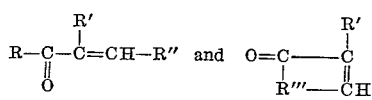

2 wherein R, R' R" and R''' have the foregoing designations. Most preferred in the present invention are alcohols and ketones of the foregoing types wherein R is an alkyl or aromatic group having from 1 to 12 carbon atoms, R' and R" each independently is hydrogen or an alkyl group having from 1 to 12 carbon atoms and R''' is a divalent alkyl or alkenyl radical having from 1 to 9 carbon atoms. Specific examples of saturated ketones useful in the present invention include methyl ethyl ketone, methyl isopropyl ketone, diethyl ketone, 2-hexanone, cyclopentanone, cyclohexanone, phenyl ethyl ketone, propiophenone, phenyl butyl ketone, 1-phenyl-3-butanone and 1-phenyl-2-butanone. Secondary alcohols found to be useful in the present invention include 2-butanol, 3-methyl-2-butanol, 2-pentanol, 2-hexanol, phenyl ethyl carbinol, 1-phenyl-3-butanol and 3-pentanol. In some instances, alpha, beta-olefinically unsaturated ketones containing two vinyl groups are formed in the instant process and this feature is meant to be included within the scope of the present invention. For instance, diethyl ketone yields either or both ethyl vinyl ketone and divinyl ketone depending upon the particular reactor conditions employed.

Several catalysts have been found to be operative in the process of this invention. In general the oxides of one or more polyvalent metal elements are useful as catalysts in the process of this invention. More particularly, the useful catalysts for this process are those composed of at least one oxide of an element appearing in Groups III, IV, V, VI or VIII of the Mendelyeev Periodic Table. Operative catalysts include the combined oxides of antimony and at least one other polyvalent metal such as the combined oxides of antimony and uranium, the combined oxides of antimony and iron, the combined oxides of antimony and manganese, the combined oxides of antimony and thorium, the combined oxides of antimony and cerium and the combined oxides of antimony and tin and mixtures of one or more of the foregoing combinations of oxides. The catalysts composed of the combined oxides of antimony and at least one other polyvalent metal may also be promoted in amounts up to 10% by weight of the catalyst with the oxides of one or more of the following metals: rhenium, niobium, copper, silver, tellurium, tungsten, lead, bismuth, palladium, iridium, cadmium, zirconium, molybdenum, zinc, thallium, calcium, gallium, tantalum, barium, platinum, boron, magnesium, cobalt and nickel. Other catalysts useful in this invention include bismuth molybdate, bismuth phosphomolybdate, antimony-bismuth molybdate, antimony-bismuth phosphomolybdate, bismuth phosphotungstate, bismuth vanadate, bismuth phosphovanadate and nickel-bismuth phosphate.

The catalysts may be used per se or in conjunction with a suitable support such as silica, silica-alumina, alumina, titania, zirconia, silicon carbide, zirconium phosphate, aluminum phosphate, boron phosphate and the like and it may be advantageous in some instances to further promote the support with boric acid, phosphoric acid or hydrogen fluoride. The support may constitute up to 90% by weight or more of the catalyst composition. The surface area of the catalysts embodied herein may vary from 1 to 100 square meters per gram with areas of from about 5 to 50 square meters per gram being preferred. The catalysts may be activated for use by heat treatment at elevated temperatures. Many of the catalysts can be made more attrition resistant by heat treating them for a minute or two up to as long as 24 hours or more in air or other molecular oxygen containing atmosphere at a temperature usually in excess of 500° F.

The preparation of olefinically unsaturated ketones is carried out in such a manner that the temperatures within the catalyst bed are maintained in the range of about 600 to 1100° F. but more preferably between about 750 and 950° F. Reactor pressure is preferably about atmospheric, however, pressures varying from −10 to 100 p.s.i.g. are operable.

Contact times of from about 0.1 to 25 seconds may be used with contact times of from 1 to 10 seconds being preferred. The molar ratio of molecular oxygen to the ketone or alcohol starting material should be at least 1:1 but it is preferably sufficiently great that some molecular oxygen is maintained in the reactor effluent. Ratios of molecular oxygen to the ketone or alcohol as high as 15:1 may be used; however, the preferred ratios fall in the range of from 5:1 to 12:1. The molecular oxygen and reactant may be mixed prior to feeding to the reactor or they may be fed separately into the reactor and mixed internally. Any source of molecular oxygen may be used such as oxygen gas, oxygen mixed with steam or air.

In the operation of the process, the unsaturated ketone product along with unconverted feed and other by-products in the reactor effluent are condensed, and the unsaturated ketone is separated from the mixture by fractionation, extraction or azeotropic distillation. The unconverted or incompletely converted feed may be recycled to the reaction. As used herein the term "per pass conversion" is defined as $$\frac{\text{No. of Moles of Product}}{\text{No. of Moles of Reactant in Feed}} \times 100$$

This invention is further illustrated by the following examples.

EXAMPLE I

The reactor used in the preparation of olefinically unsaturated ketones was a stainless steel contained fixed-bed, up-flow reactor, 5/8 inch in diameter and 19 inches in height. Temperatures were controlled by immersion of the reactor in a molten salt bath. The reactor effluent was passed through a water-cooled condenser, ice cooled receiver, ice cooled water scrubber, ice cooled scrubber containing a suitable organic solvent such as acetone and a Dry Ice trap, before sampling and metering of the fixed gases. The fixed gases were analyzed by a Fisher Partitioner. The liquid condensate and scrubber solutions were analyzed by conventional gas chromatography using a variety of columns. The combination of gas chromatography separation and mass spectrometric analysis was used for identifying the product.

The catalysts used in the various reactions were prepared as follows:

A. A catalyst composed of the oxides of antimony and manganese on a silica support was prepared by slowly adding 45 grams of finely divided antimony metal to 186 ml. of concentrated nitric acid and boiling the mixture until the evolution of brown fumes ceased. The resulting suspension of hydrous antimony oxide was mixed with 98 grams of a 50% solution of manganous nitrate with constant stirring. 129 grams of a 30% by weight dispersion of silica in water were added to the reaction mixture with stirring. A solution containing 200 ml. of water and 150 ml. of a 28% solution of $NH_4OH$ in water was added to bring the pH of the mixture to about 8. Stirring was continued for 10 minutes after which time the suspension was filtered with suction. The solid was washed with 250 ml. of a solution prepared by diluting 20 ml. of 28% $NH_4OH$ with water. Washing was conducted in three equal portions and after the last washing the suction was continued for 10 minutes. The resulting cake was dried at 120° C. for six hours, calcined at 800° F. overnight and then heated at 1400° F. for 12 hours. The solid product was then ground to pass a 170 mesh screen and then mixed with 43 grams of a 30% by weight dispersion of silica in water and the mixture was stirred and mixed thoroughly. The slurry was extruded through a small extruder into a rod-like extrudate having about 1/8 inch diameter and the extrudate was dried in air for four hours, dried at 120° C. overnight and heated at 1400° F. for 12 hours. The product was composed of 60% by weight of the combined oxides of antimony and manganese in the weight ratio of 75:25 Sb:Mn and 40% by weight of silica. The empirical formula for this catalyst can be expressed as 60% (75 Sb/25 Mn)–40% $SiO_2$.

B. 45 grams of tin metal were oxidized by mixing with a solution of 189 ml. of nitric acid in 757 ml. of water. 23.1 grams of antimony metal were oxidized by mixing with 95 ml. of nitric acid. The foregoing mixtures were then combined and 56.2 grams of a 30% by weight suspension of silica in water were added to the mixture. Ammonium hydroxide was used to bring the pH of the mixture to about 8. The resulting slurry was filtered, the solid was washed, dried at 120° C. for 15 hours, heated at 800° F. for 24 hours and heated at 1725° F. for eight hours. The resulting solid material was then ground to pass a 170 mesh screen and then added to 56.2 grams of the 30% silica suspension in water and thorough mixing was accomplished. The resulting slurry was extruded by means of a small extruder and the extrudate was air dried for four hours, dried at 120° C. for 15 hours and heated at 1725° F. for eight hours. In accordance with the terminology used in A above, the formula for this catalyst can be expressed as 70% (65% $SnO_2$/35% $Sb_2O_3$)–30% $SiO_2$.

C. 2.06 grams of antimony metal were oxidized to $Sb_2O_3$ by mixing with 8.5 ml. of concentrated nitric acid. To this mixture were added 14.58 grams of $(NH_4)_6Mo_7O_{24} \cdot 4H_2O$ partially dissolved in water, with stirring on a hot plate. Then 120.3 grams of a 30% by weight dispersion of silica in water were added and the mixture was stirred until it gelled. A mixture of 20.5 grams of $Bi(NO_3)_3 \cdot 5H_2O$ in 12 ml. of a 10% by volume $HNO_3$-water solution was next added to the reaction mixture. The resulting mixture was heated and stirred until a thick gel formed. The gel was extruded and the extrudate was dried at 120° C. and then heated at 800° F. overnight and at 1000° F. for four hours. The formula for this catalyst may be expressed as 40%

$(Sb_{2.5}Bi_6Mo_{12}O_{48.7})$–60% $SiO_2$

D. 73 grams of $Bi(NO_3)_3 \cdot 5H_2O$ were dissolved in 50 ml. of water containing 5 ml. of concentrated nitric acid. 22 grams of $Ni(NO_3)_2 \cdot 6H_2O$ were dissolved in 55 ml. of water and the two solutions were combined. To the combined solutions were added 1.9 ml. of 85% phosphoric acid. To the foregoing mixture were then added 71.5 grams of a 30% by weight suspension of silica in water and ammonium hydroxide was used to adjust the pH of the mixture to about 8. The resulting gel was filtered and the solid was washed with water, dried for 12 hours at 120° C. and heated at 800° F. for 16 hours. The resulting material was ground to a fine powder and was mixed with 23.8 grams of the silica-water suspension. The resulting slurry was extruded and the extrudate was air dried for four hours, dried at 120° C. overnight and heated at 1000° F. for 16 hours. The formula for this catalyst may be expressed as 60% $(Ni_{2.7}Bi_{5.4}PO_{13.3})$–40% $SiO_2$.

E. 426.2 grams of $Sb_2O_3$ were boiled for 45 minutes in 1300 ml. of concentrated nitric acid. After cooling, there were added 166.5 grams of $Fe(NO_3)_3 \cdot 9H_2O$ dissolved in 300 ml. of distilled water and 364 grams of ammonium stabilized 30% by weight silica in water suspension. To this slurry were added 1190 ml. of aqueous NH₄OH until the pH was about 8. The resulting precipitate was isolated by filtration and was washed twice with 1000 ml. portions of distilled water and dried overnight at 120° C. The solid was then heated at 800° F. for 8 hours and at 1400° F. for 8 hours in air. Approximately 573 grams of product resulted. This material was crushed and ball milled until substantially all of it passed a 200 mesh screen and it was then mixed with 360 grams of an ammonium stabilized 30% by weight dispersion of silica in water. The resulting slurry was extruded by hand using a cake decorator and the extrudate was dried for 12 hours at 120° C. and in air at 1400° F. for 48 hours. The formula for this catalyst is 70% (94 Sb/6 Fe)–30% $SiO_2$.

F. 322.8 grams of $Sb_2O_3$ and 136.2 grams of $U_3O_8$ were boiled together in a mixture of 400 ml. of concentrated nitric acid and 400 ml. of distilled water for one hour and then cooled. To this mixture were added 386.2 grams of a 30% by weight dispersion of silica in water along with enough NH₄OH to obtain a final pH of about 8. The resulting slurry was filtered and the solid was washed twice with 1000 ml. portions of distilled water. The resulting solid was dried overnight at 120° C., at 800° F. for 24 hours and at 1725° F. for 8 hours. The resulting solid was ball milled for 2 hours and then 476 grams of the ground solid were mixed with 529 grams of the 30% by weight dispersion of silica in water in a Waring Blendor. The resulting slurry was extruded onto aluminum foil using a hand operated cake decorator. The extrudate was air dried about 16 hours and then heated at 1800° F. for 16 hours. The formula for this catalyst is 60% (70 Sb/3 OU)–40% $SiO_2$.

G. The procedure of F was repeated except that the final product was heated at 1725° F. for 72 hours instead of 1800° F. for 16 hours. The formula for this catalyst is the same as that given in F.

H. 400 grams of the wet filter cake of a catalyst prepared according to the procedure of F containing 60% by weight of the combined oxides of anitmony and uranium and 40% by weight of silica wherein the weight ratio of antimony metal to uranium metal was 70:30 were mixed with 307 grams of a similar catalyst which had been heated for 44 hours at 1725° F. The mixture was then heated at 1725° F. for 4 hours. The formula for this catalyst is the same as that given in F.

I. 16,700 pounds of a 30% by weight dispersion of silica in water were added to a reactor. To this were added with stirring 148 pounds of 85% $H_3PO_4$ and a solution of 2,480 pounds of ammonium dimolybdate (85% $MoO_3$) in 350 gallons of soft water. A bismuth nitrate solution prepared by dissolving 5,580 pounds of $Bi(NO_3)_3 \cdot 5H_2O$ in 350 gallons of 5 volume percent nitric acid (70% $HNO_3$ reagent) at 125° F. was added to the reaction mixture about 20 minutes after the completion of the molybdate solution. The resulting slurry which was found to have a specific gravity of about 1.33, a pH of about 2 or less and was slightly thixotropic was stirred for about 20 minutes and then it was spray dried under the following conditions:

Atomizer _____ 7″ drilled hole wheel.
Wheel speed _____ 10,500 r.p.m.
Inlet air temperature _____ About 425° F.
Outlet air temperature ____ About 175° F.
Feed rate _____ About 17 lb./min.

The heat treatment consisted of raising the temperature of the solid to 800–1000° F. for a time sufficient to decompose the volatile nitrates. The formula for this catalyst is 50% $(Bi_9PMo_{12}O_{52})$–50% $SiO_2$.

The preparation of alpha, beta-olefinically unsaturated ketones employing the foregoing catalysts is described in Table I.

TABLE I

| Reactant | Catalyst | Contact Time, sec. | Temp., °F. | Air/Feed | Percent per Pass Conversion to $\alpha,\beta$-Unsaturated Ketones |
| --- | --- | --- | --- | --- | --- |
| Methy Ethyl Ketone | F | 3 | 890 | 6 | 46.4 |
|  | F | 3 | 900 | 6 | 33.5 |
|  | E | 3 | 890 | 6 | 30.4 |
|  | I | 3 | 890 | 6 | 11.5 |
| Methyl Isopropyl Ketone | F | 3 | 750 | 8 | 15.0 |
|  | E | 3 | 750 | 8 | 24.1 |
| Cyclopentanone | F | 3 | 820 | 8 | 12.9 |
|  | F | 3 | 815 | 8 | 13.6 |
| Cyclohexanone | F | 3 | 825 | 8 | 7.5 |
| Phenyl Ethyl Ketone | F | 3 | 830 | 8 | Trace |
| Methyl n-Propyl Ketone | F | 3 | 740 | 8 | Trace |
| 2-butanol | F | 3 | 890 | 6 | 19.0 |
| 3-methyl=2-Butanol | F | 4 | 850 | *8 | 8.5 |
| 3-pentanol | F | 4 | 900 | 8 | 15.1 |

*8 moles N₂/mole feed.

In Table I the $\alpha,\beta$-olefinically unsaturated ketones formed were methyl vinyl ketone, methyl isopropenyl ketone, cyclopentenone, cyclohexenone, phenyl vinyl ketone, methyl propenyl ketone, methyl vinyl ketone, methyl isopropenyl ketone and a mixture of methyl vinyl ketone and divinyl ketone from methyl ethyl ketone, methyl isopropyl ketone, cyclopentanone, cyclohexanone, phenyl ethyl ketone, methyl n-propyl ketone, 2-butanol, 3-methyl-2-butanol and 3-pentanol, respectively.

EXAMPLE II

The procedures outlined in Example I were followed in the preparation of methyl vinyl ketone from methyl ethyl ketone with several different catalysts. The results of these preparations are given in Table II wherein the catalyst designation refers to the catalyst designations used in Example I. The reaction conditions were 890° C., 3 second contact time and air:methyl ethyl ketone molar ratios of 8:1 for the first five experiments and 6:1 for the last two experiments given in Table II.

TABLE II

| Catalyst: | Percent per pass conversion to methyl vinyl ketone |
|---|---|
| G | 18.2 |
| C | 16.1 |
| D | 14.1 |
| A | 20.6 |
| B | 19.1 |
| E | 26.6 |
| I | 11.5 |

EXAMPLE III

Table III shows the effect of various process variables in the preparation of methyl vinyl ketone from methyl ethyl ketone and from secondary butanol in the presence of a catalyst composed of the combined oxides of antimony and uranium.

TABLE III

| Catalyst | Air/Feed (Molar) | Diluent | Temp., °F. | Contact Time, sec. | Percent per Pass Conversion to Methyl Vinyl Ketone |
|---|---|---|---|---|---|
| Feed: Methyl Ethyl Ketone | | | | | |
| G | 8/1 | None | 890 | 3 | 18.2 |
| G | 8/1 | $H_2O$ | 890 | 3 | 13.7 |
| A | 8/1 | None | 890 | 3 | 19.1 |
| A | 8/1 | $4N_2$ | 890 | 3 | 18.4 |
| H | 6/1 | None | 890 | 3 | 48.7 |
| G | 8/1 | ---do--- | 890 | 3 | 18.2 |
| G | 10/1 | ---do--- | 890 | 3 | 9.3 |
| Feed: Secondary Butanol | | | | | |
| F | 6/1 | None | 890 | 3 | 19.0 |

The $\alpha,\beta$-olefinically unsaturated ketones formed according to the procedures outlined in the foregoing examples as well as others falling within the scope of this invention are useful as solvents, reactive intermediates and as monomers in the production of homopolymers and copolymers useful as plastics, rubbers, etc.

We claim:
1. The process for preparing an olefinically unsaturated ketone selected from the group consisting of

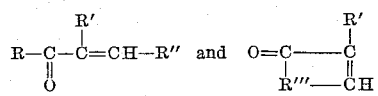

wherein R is an alkyl or aromatic group having from 1 to 12 carbon atoms, R' and R" each independently is hydrogen or an alkyl group having from 1 to 12 carbon atoms and R''' is a divalent alkyl or alkenyl radical having from 1 to 9 carbon atoms comprising contacting at least one saturated alcohol or ketone reactant selected from the group consisting of

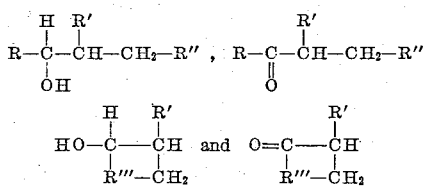

wherein R, R', R" and R''' all have the foregoing designations with oxygen wherein the molar ratio of oxygen to said saturated alcohol or ketone is from 1:1 to 15:1 in the presence of a solid catalyst comprising (A) the combined oxides of antimony and at least one other polyvalent metal selected from the group consisting of uranium, iron, manganese, thorium, cerium and tin or (B) a member selected from the group of bismuth molybdate, bismuth phosphomolybdate, antimony bismuth molybdate, antimony bismuth phosphomolybdate, bismuth phosphotungstate, bismuth vanadate, bismuth phosphovanadate, and nickel bismuth phosphate at a temperature in the range of about 600 to 1100° F.

2. The process of claim 1 wherein the elevated temperature is in the range of about 750 to 950° F.

3. The process of claim 2 carried out at a pressure varying from −10 to 100 p.s.i.g.

4. The process of claim 3 wherein the olefinically unsaturated ketone is methyl vinyl ketone and the reactant is methyl ethyl ketone.

5. The process of claim 3 wherein the olefinically unsaturated ketone is methyl isopropenyl ketone and the reactant is methyl isopropyl ketone.

6. The process of claim 3 wherein the olefinically unsaturated ketone is cyclopentenone and the reactant is cyclopentanone.

7. The process of claim 3 wherein the olefinically unsaturated ketone is cyclohexenone and the reactant is cyclohexanone.

8. The process of claim 3 wheerin the olefinically unsaturated ketone is phenyl vinyl ketone and the reactant is phenyl etheyl ketone.

9. The process of claim 3 wherein the olefinically unsaturated ketone is methyl propenyl ketone and the reactant is methyl n-propyl ketone.

10. The process of claim 3 wherein the olefinically unsaturated ketone is methyl vinyl ketone and the reactant is 2-butanol.

11. The process of claim 3 wherein the olefinically unsaturated ketone is methyl isopropenyl ketone and the reactant is 3-methyl-2-butanol.

12. The process of claim 3 wherein the olefinically unsaturated ketone is a mixture of methyl vinyl ketone and divinyl ketone and the reactant is 3-pentanol.

References Cited

UNITED STATES PATENTS 2,101,820  12/1937  Woodhouse _____ 260—486

FOREIGN PATENTS 681,611  10/1952  Great Britain.
938,854  10/1963  Great Britain.

OTHER REFERENCES

Weissberger et al., "Cat, Photochem., Electrolytic Reactions" pp. 164 to 167 (1956).

LEON ZITVER, Primary Examiner.

M. JACOB, Assistant Examiner.